UNITED STATES PATENT OFFICE.

SMITH W. KIMBLE, OF DENVER, COLORADO, ASSIGNOR TO THE MICA ASBETITE INSULATING COMPANY, OF SAME PLACE.

INSULATING COMPOSITION.

SPECIFICATION forming part of Letters Patent No. 464,367, dated December 1, 1891.

Application filed February 24, 1891. Serial No. 382,577. (No specimens.)

*To all whom it may concern:*

Be it known that I, SMITH W. KIMBLE, a resident of Denver, Arapahoe county, Colorado, and a citizen of the United States of America, have invented a new and useful Improvement in Insulating Compositions, which improvement is fully set forth in the following specification.

This invention relates to the production of compositions of matter having the properties of high electrical resistance and of self-lubrication and being also fire and water proof. By reason of these properties the composition or compositions produced according to this invention are capable of many industrial applications.

Mica, which is an essential ingredient of the compositions herein described, has been long recognized as an efficient substance for insulating electrical conductors, as capable of resisting the action of fire, and also as an anti-friction substance; but difficulty has been experienced in attempting to combine this mineral with other substances which will produce a plastic moldable compound without impairing the properties mentioned. When compounded with shellac and resinous substances, the resulting product lacks strength and cohesion, and therefore is usually combined with metal strengthening plates or pieces. Moreover, binding agents of this character are more or less inflammable or subject to the influence of heat.

It has been proposed heretofore to consolidate finely-divided mica with soluble glass (silicate of soda) alone; but while these substances unite under high pressure in a mold the mass is elastic and swells out as soon as pressure is removed. It has also been proposed to combine the mica and silicate of soda with earthy substances, such as lime, sand, plaster-of-paris, or paris-white; but the chemical action between the alkaline silicate and the lime in any form produces effects that are very detrimental. To obtain a composition suitable for the purposes indicated herein, I have found it necessary to exclude lime entirely.

According to my invention compositions are formed by combining mica and silicate of soda (preferably in the form of soluble glass) with another mineral substance or substances which will promote cohesion of the several ingredients and enable the compound to be molded by pressure to any desired form without changing its shape after pressure is removed. Of these mineral substances several may be specified which have the properties necessary for the purposes of this invention. I obtain good results by the use of a peculiar variety of talc mined in Colorado and there known as "Chinese tallow." It is important to use talc free from lime or its compounds which are often found in association with it; otherwise the mass, instead of being tough, hard, and coherent, will be liable to disintegration. The presence and chemical action of lime are also indicated by a frost-like film or crust which gathers on the exterior of the molded article.

In place of talc I have used with good effect feldspar ground to a very fine powder, very fine kaolin, and also asbestus reduced to a fine state of division. It will be understood, therefore, that these substance are equivalents for talc for the purposes of this invention.

In preparing the composition I take, say, forty parts, by weight, of mica in the form known as "atomized" mica, forty parts of talc or its equivalent, and about three parts of silicate of soda. These proportions may of course vary. The materials are thoroughly mixed or incorporated by attrition, using any well-known mixing apparatus. The mass at this stage does not contain sufficient moisture to make it pasty or coherent, but is in a loose condition. When subjected, however, to a pressure of, say, five thousand pounds to the square inch, more or less, it compacts into a dense solid coherent mass and retains its shape perfectly after the pressure is removed.

It is of importance in carrying out the invention to avoid excess of moisture. When, say, from three to five per cent. of water-glass is used in making the mixture, this element contains all the moisture necessary for proper action under the press. If the silicate is used in the form of dry crystals, two per cent. of water, or thereabout, must be added. The amount of water is so slight that its presence is scarcely noticeable, and it will not cause cohesion of the particles under moderate pressure. Nevertheless when high pressure is applied, as above specified, it produces a compact and tenacious mass.

In drying it is desirable, though not necessary, to use moderate heat to assist in expelling the little moisture which the article contains.

In order to make the mass thoroughly water-proof and also to increase its density, I treat it with paraffine or other analogous water-proof substance.

It has been common heretofore to waterproof various substances and articles by immersing them in paraffine liquefied by heat. For the purposes of this invention it is desirable to cause the paraffine to permeate the interior of the mass, and this I effect by heating the latter to 150° Fahrenheit and upward and then treating it with paraffine. The mass being thus heated throughout, the paraffine does not congeal at or near the surface, but is drawn into all the pores of the article. For such cases as require a very hard and refractory compound I add to the above ingredients sulphur either in the form of commercial flour of sulphur or as a natural sulphur compound, such as iron, copper, or antimony pyrites. This subcompound is within the principle and scope of my invention. I do not, however, claim specifically a composition of sulphur, mica, asbestus, and silicate of soda, as I have made a separate application therefor, filed February 26, 1891, Serial No. 382,871.

These compounds are useful in the manufacture of electrical appliances and in many other industries in which moldable plastic substances are used, being particularly applicable to devices in which it is desired to combine or mold the plastice substance against or around metallic or other parts. It is useful for lining or surfacing journal-boxes and other friction-bearings, particularly in case of devices that are difficult of access for oiling. The sheaves on which the cables of traction railways are supported is an example.

The material can be readily sawed or drilled or otherwise acted on by edge-tools. A screw-thread can be cut upon it when desired.

I claim—

The composition described, consisting, essentially, of pulverized mica, silicate of soda, and a mineral substance, such as talc free from lime, combined and molded under pressure, as set forth.

In testimony whereof I have signed this specification in the presence of two subscribing witnesses.

SMITH W. KIMBLE.

Witnesses:
PHILIP MAURO,
JONA B. CILLEY.